(12) United States Patent
Williams

(10) Patent No.: US 8,443,834 B2
(45) Date of Patent: May 21, 2013

(54) NOZZLE CHECK VALVE

(75) Inventor: James Ola Williams, Marlborough, MA (US)

(73) Assignee: Mueller International, LLC, Atlanta, GA (US)

( * ) Notice: Subject to any disclaimer, the term of this patent is extended or adjusted under 35 U.S.C. 154(b) by 97 days.

(21) Appl. No.: 13/072,702

(22) Filed: Mar. 26, 2011

(65) Prior Publication Data

US 2012/0241020 A1  Sep. 27, 2012

(51) Int. Cl.
*E03B 9/02* (2006.01)
*F16K 15/00* (2006.01)

(52) U.S. Cl.
USPC .......................... 137/527; 137/299; 137/527.8

(58) Field of Classification Search
USPC ................ 137/299, 272, 527.4, 527.6, 527.2, 137/527.8, 527
See application file for complete search history.

(56) References Cited

U.S. PATENT DOCUMENTS 3,939,861 A * 2/1976 Thompson .................... 137/299
6,910,495 B2 * 6/2005 Lafalce ......................... 137/299
7,559,338 B2 * 7/2009 Scobie et al. ............... 137/527.4

* cited by examiner

*Primary Examiner* — Kevin Lee
(74) *Attorney, Agent, or Firm* — Taylor English Duma LLP

(57) ABSTRACT

A protection system for protecting a fire hydrant is disclosed having an interior, the protection system including a nozzle having a first end to be secured to the hydrant and a second end configured to engage a fire hose coupling, the nozzle defining a bore that is in fluid communication with the interior of the fire hydrant, wherein the nozzle defines a seat disposed in the bore; and a disc disposed within the bore and configured to move axially and rotationally from a normally closed position to an open position in response to an increase in pressure within the interior of the fire hydrant.

18 Claims, 15 Drawing Sheets

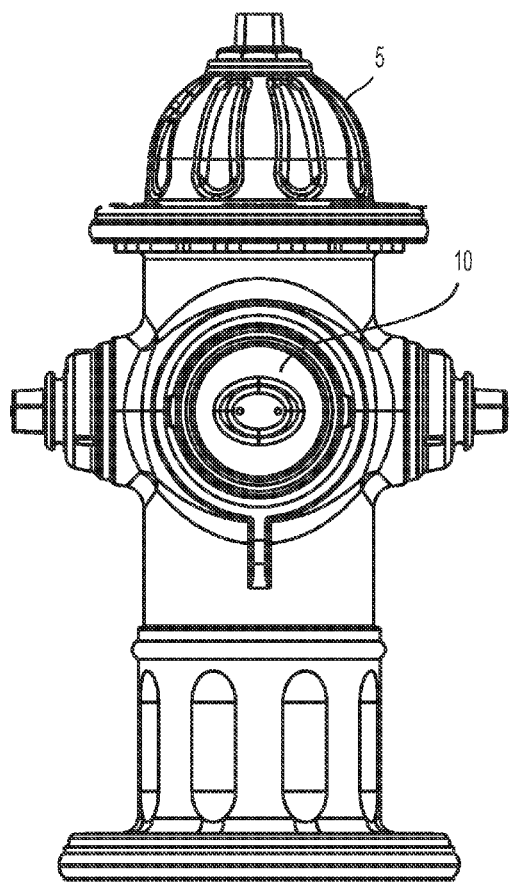
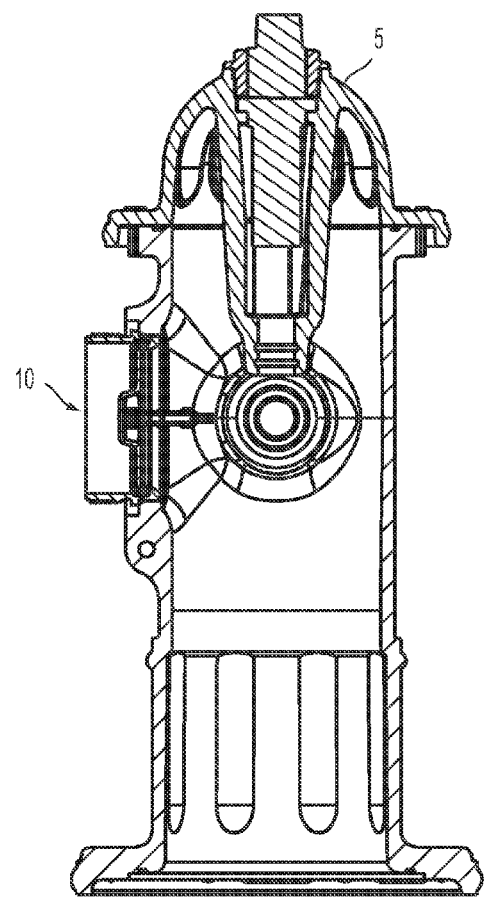
FIG. 1A
FIG. 1B

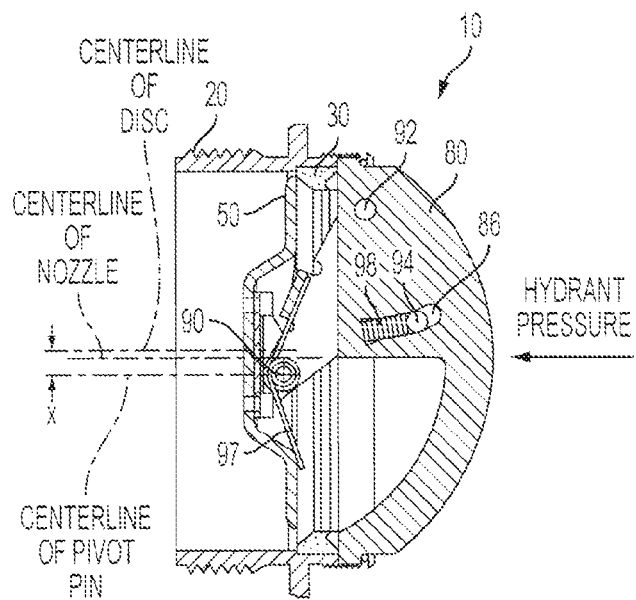
FIG. 8A
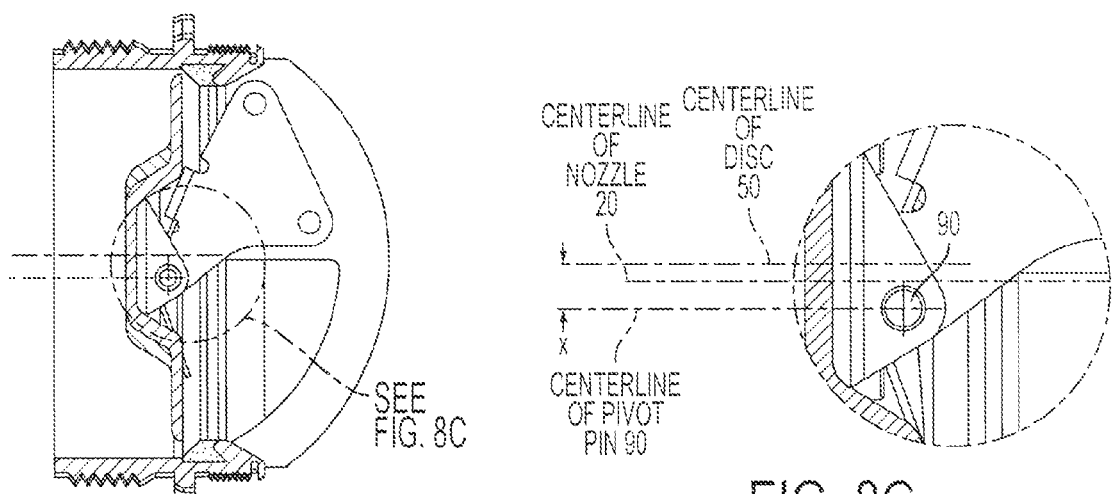
FIG. 8B
FIG. 8C

NOZZLE CHECK VALVE

FIELD

The present disclosure generally relates to systems for protecting pipelines from the introduction of contaminates. More specifically, the present disclosure provides a protection system or check valve including a disc that moves from a normally closed position to an open position in response to an increase in pressure within the pipeline.

BACKGROUND

Because fire hydrants are located in nearly every neighborhood, sabotage of fire hydrants is a constant risk. This can create a serious issue concerning possible contamination of municipal water supplies. A common approach to protecting municipal water systems includes heightening security at central sites, such as reservoirs, treatment plants, and pumping stations. These measures, however, fail to address the problem of drinking water contamination by terrorists attacking a water supply by way of easily accessible fire hydrants.

The public is typically unaware that fire hydrants are connected to the municipal drinking water system. A hydrant, which is capable of passing hundreds of gallons per minute, could provide a way of injecting large volumes of chemical contaminants into the water system. Further, since hydrants are located in the communities they serve, such acts of terrorism could evade treatment, monitoring, and other protective measures presently in place.

Conventional methods of protecting fire hydrants require a separate operation to unlock or disarm a protection device of the fire hydrant, such as a unique cap or cover. Typically, these methods require that fire fighters have possession of a unique key or other device to remove the protection device. Only after the protection device has been removed or disabled are the fire fighters able to connect a fire hose to the hydrant.

A problem with conventional fire hydrant protection devices is a result of the protection itself. A fire fighter must carry a key or disabling device to permit access to the water supply being protected. Without the key, the water supply cannot be accessed by the protected hydrant. This can result in a loss of critical time that could be used to extinguish the existing fire. Further, if the protection device is a loose piece which can require refitting, the device may not be recovered and reinstalled until after the emergency is over, thus eliminating the benefit of protecting the hydrant. Accordingly, a need exists for improved fire hydrant protection systems.

SUMMARY

Various embodiments of the disclosure provide systems for protecting a pipeline from introduction of contaminates. Generally described, at least one embodiment provides a protection system that includes a nozzle and a disc that moves from a normally closed position that blocks the introduction of contaminates into a pipeline, to an open position in response to increasing pressure in the pipeline. In one implementation, the nozzle includes a first end to be secured to a hydrant and a second end configured to engage a fire hose coupling, and the nozzle defines a bore that is in fluid communication with the interior of the fire hydrant when the nozzle is connected to the hydrant, wherein the nozzle further defines a seat disposed in the bore. In addition, the disc is disposed within the bore and configured to move axially and rotationally from a normally closed position to an open position in response to an increase in pressure.

In one embodiment, a protection system for protecting a fire hydrant is provided. The fire hydrant has an interior and the protection system includes a nozzle, a disc and at least two pivot pins. The nozzle has a first end secured to the hydrant and a second end configured to engage a fire hose coupling, and the nozzle defines a bore that is in fluid communication with the interior of the fire hydrant, wherein the nozzle defines a seat disposed in the bore. The disc is disposed within the bore and configured to move from a normally closed position to an open position in response to an increase in pressure within the interior of the fire hydrant. The at least two pivot pins are disposed intermediate the first end of the nozzle and the disc, wherein the two pivot pins pivotably connect the disc relative to the nozzle, and wherein the disc pivots about the two pivot pins to move away from the seat axially and rotationally and to move from the normally closed position to the open position.

In another embodiment, a protection system for protecting a fire hydrant having an interior is provided. The protection system includes a nozzle, a disc, a brace and a bracket. The nozzle has a first end to be secured to the fire hydrant and a second end configured to engage a fire hose coupling. The nozzle defines a bore that is in fluid communication with the interior of the fire hydrant, wherein the nozzle defines a seat disposed in the bore. The disc is disposed within the bore and is configured to move from a normally closed position where the disc is biased against the seat to an open position where fluid is permitted to flow from the first end of the nozzle to the second end of the nozzle. The brace is disposed proximate the first end of the nozzle, and the bracket is pivotably attached to the brace about a first axis and pivotably attached relative to the disc about a second axis. The bracket is configured to pivot about the first axis, and the disc is configured to pivot about the second axis as the disc moves from the normally closed position to the open position in response to an increase in pressure within the interior of the fire hydrant.

In another embodiment, a pipeline protection system is provided. This protection system includes a nozzle, a disc, a brace and a bracket. The nozzle has a first end and a second end with a bore providing a fluid communication path from the first end to the second end. The nozzle includes a seat disposed in the bore intermediate the first end and the second end. The disc is disposed within the bore that is configured to move from a normally closed position where the disc is biased against the seat to discourage the flow of contaminates from the second end of the nozzle to the first end of the nozzle, to an open position where fluid is permitted to flow from the first end of the nozzle to the second end of the nozzle. The brace is disposed proximate the first end of the nozzle and the bracket is pivotably attached to the brace about a first axis and pivotably attached relative to the disc about a second axis. The bracket is configured to pivot about the first axis, and the disc is configured to pivot about the first axis and the second axis as the disc moves from the normally closed position to the open position in response to an increase in pressure differential between the first end of the nozzle and the second end of the nozzle.

In various embodiments, the protection system of the current disclosure may be understood by one of skill in the art to be a check valve. However, no particular feature of any specific check valve should be considered limiting on the present disclosure.

BRIEF DESCRIPTION OF THE FIGURES

The features and components of the following figures are illustrated to emphasize the general principles of the present disclosure and are not necessarily drawn to scale. Corresponding features and components throughout the figures may be designated by matching reference characters for the sake of consistency and clarity.

FIGS. 1A, B illustrate a fire hydrant including a protection system 10, in accordance with an embodiment as disclosed.

FIGS. 8 A-C are cross-sectional views of the protection system 10 of FIGS. 7A-C illustrating the disc moved relative to the nozzle.

DETAILED DESCRIPTION

The present disclosure will be examined more fully hereinafter with reference to the accompanying drawings, in which some, but not all embodiments of the embodiments are shown. Indeed, the examples disclosed herein may be embodied in many different forms and should not be construed as limiting to the claims set forth herein; rather, these embodiments are provided so that this disclosure will satisfy applicable legal requirements. For convenience, like numbers refer to like elements throughout.

Various embodiments of the present disclosure provide a system for protecting a pipeline from the introduction of contaminates. To facilitate an understanding of the principles and features of various embodiments, applications to fire hydrant embodiments will be described. In particular, the description herein will be phrased in the context of a fire hydrant protection system. It should be understood, however, that the disclosure is not limited to protection system for a fire hydrant. Rather, the scope of the disclosure includes all applications where a protection system to protect an interior of a pipeline is needed or desired. For example, the protection system can also be used when prevention of gas or liquid backflow is needed or desired. Accordingly, the protection system described hereinafter as a fire hydrant protection system can also find utility as a protection system for purposes other than protecting an interior of a fire hydrant. It should be noted that, in various embodiments, the protection system of the current disclosure may be understood by one of skill in the art to function as a check valve. However, no particular feature of any check valve should be considered limiting on the claimed elements disclosed herein.

Protection System 10

FIGS. 1A-B illustrate a fire hydrant 5 including a protection system 10. FIG. 1A is a front perspective view of the fire hydrant 5, and FIG. 1B is a side partial cross-sectional view of the fire hydrant 5. The fire hydrant 5 is an active fire protection measure that provides a source of water to many urban, suburban, and rural areas to enable firefighters to tap into a municipal water supply to assist with extinguishing fires. Typically, a hose (not shown) is attached to a nozzle on the fire hydrant 5. A hydrant valve (not shown) may be opened to provide a powerful source of water through the fire hydrant 5, and into the attached hose. The fire hydrant 5 may be any type of conventional fire hydrant tapped to a municipal water supply or like water supply. For security reasons, a protection system 10 may be included with the fire hydrant 5.

Figure 2:
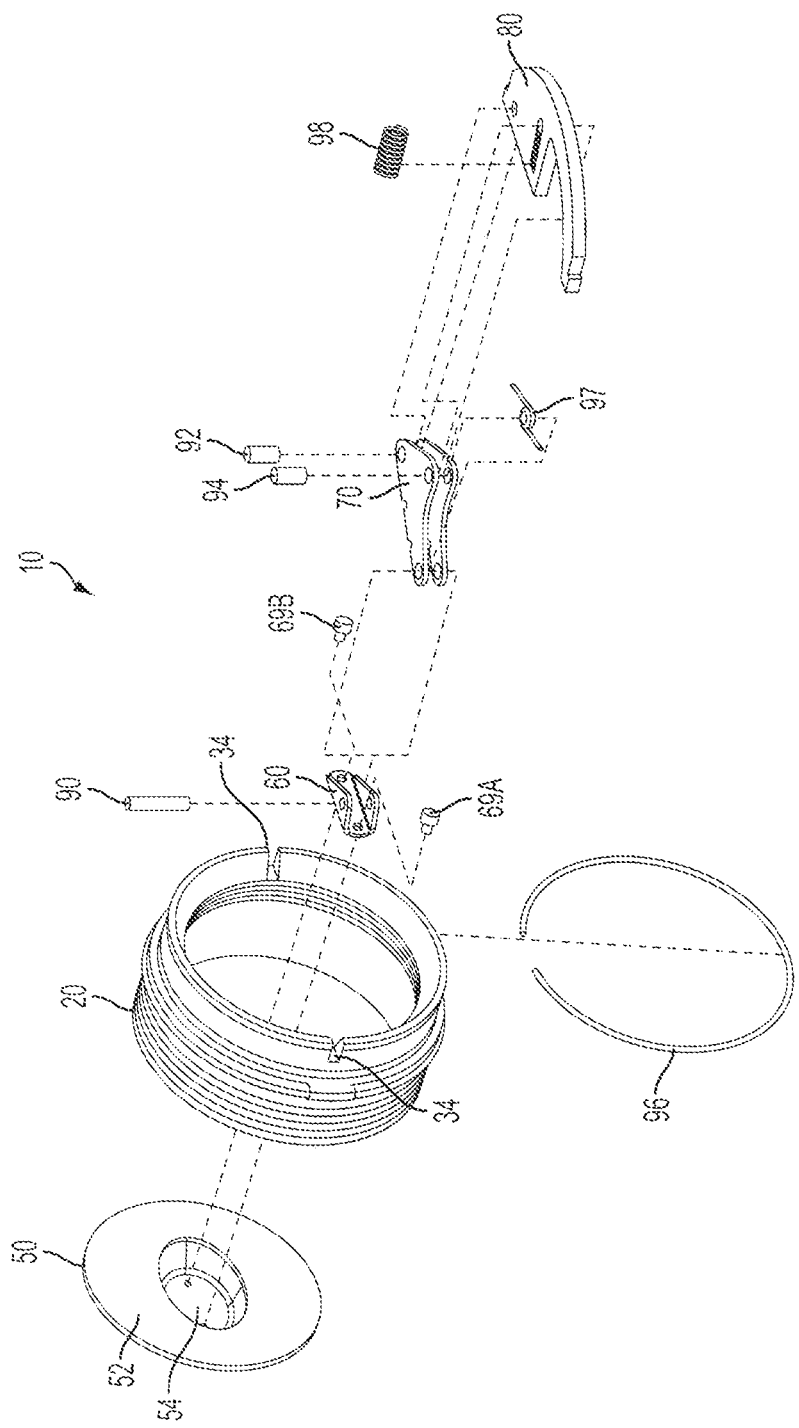
FIG. 2 is an exploded view of the protection system 10 of FIG. 1.

FIG. 2 is an exploded view of the protection system 10. The protection system 10 includes a nozzle 20, a disc 50, a disc bracket 60, a pivot bracket 70, and a brace 80.

Generally described, the nozzle 20 provides a conduit for directing water from a fire hydrant to a hose in fire hydrant applications. The disc 50 is positioned within the nozzle 20 and is biased against a seal within the nozzle 20 to prevent introduction of contaminates into the interior of the hydrant. In the event of a fire, a valve (not shown) within the hydrant (not shown) is opened by a fireman to provide access to the municipal water supply. As water pressure builds within the hydrant, the disc 50 will initially move away from the seal and then rotate such that water is allowed to flow past the protection system 10 into the hose (not shown) connected thereto. When the hydrant valve is closed, the disc 50 will return to its close position against the seal.

Figure 3:
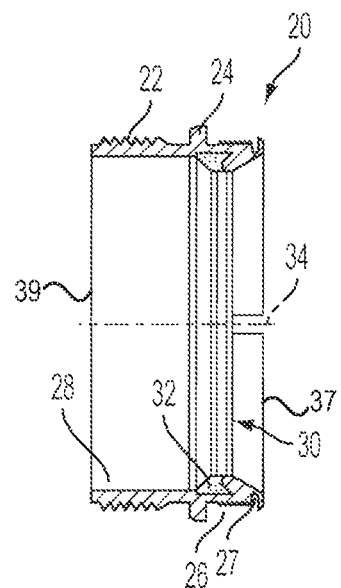
FIG. 3 is schematic diagram of a nozzle 20 of the protection system 10 of FIG. 1.

Referring to FIG. 3, the nozzle 20 is a substantially cylindrical structure with a hose engagement section 22 disposed proximate one end of the nozzle 20 and a hydrant engagement section 26 disposed on the opposite end of the nozzle 20. As noted above, the protection system 10 is configured to discourage introduction of contaminates from a hose end 39 of the nozzle 20 into a hydrant end 37 of the nozzle 20.

In the illustrated embodiment, the hose engagement section 22 and the hydrant engagement section 26 include threads to facilitate attachment with a hose coupling and a hydrant, respectively. In other embodiments, these two engagement sections may include other known or developed types of engagement configurations to facilitate attachment of a hose or hydrant to the nozzle 20.

Intermediate the hose engagement section 22 and the hydrant engagement section 26 is an attachment ring 24. The attachment ring 24 protrudes outwardly from the circumference of the nozzle 20. In the illustrated embodiment, the attachment ring 24 is configured to engage a recess within the fire hydrant (not shown) and provides a way to secure the nozzle 20 to the hydrant. Other embodiments may not include an attachment ring 24.

The nozzle 20 defines a bore 28 having an inner diameter. An annular seat 30 is disposed within the bore 28. In various embodiments, the seat 30 is an annular ring extending inwardly from the bore 28, and includes a rubber seal 32 disposed thereon. The seat 30 may include a groove or other attachment mechanism to retain the rubber seal 32. This seat 30 is configured to interact with the disc 50 to discourage introduction of contaminates into the interior of a fire hydrant or other pipeline. In further embodiments, the seat may not include a rubber seal.

The nozzle 20 includes mechanisms for securing other components of the protection system 10 within the nozzle 20 as shown in FIG. 2. In various embodiments, the nozzle 20 includes notches 34 proximate the hydrant end 37 of the nozzle 20. These notches 34 are sized and shaped to receive portions of the brace 80. The nozzle 20 also includes a groove 27 disposed on the outer circumference of the nozzle proximate the hydrant end 37 of the nozzle. The groove 27 is sized to accept a retention ring 96. In the protection system 10, portions of the brace 80 are disposed in the notches 34 and the retention ring 96 is disposed in the groove 27. The retention ring 96 is configured to restrict movement of the brace 80 relative to the nozzle 22.

The disc 50 is disposed within the nozzle 20 and is configured to move between a closed position, which discourages the flow of contaminates into the interior of the hydrant (not shown) and an open position, which allows fluid to flow from the hydrant to the hose (not shown). In various embodiments, the disc 50 is substantially circular and includes a planar portion 52 proximate the periphery of the disc 50 and a pocket portion 54 proximate the center of the disc 50. In the illustrated embodiment, the pocket portion 54 is substantially oval; however, in other embodiments, the pocket portion 54 may have a different shape such as circular, rectangular, or other desired shape. Further embodiments may not include a pocket portion 54, and instead the disc may be substantially planar. In various embodiments, the disc 50 is disposed within the nozzle 20 such that the pocket portion 54 opens towards the hydrant. In other embodiments, the disc 50 may include an annular surface configured to engage the seat, but does not include a planar portion 52.

In various embodiments, the disc 50 is formed from metal, aluminum or other durable material. In some embodiments, a resilient coating or a resilient extension is disposed proximate the periphery of the disc 50, and this resilient material interacts with the seat 30.

In various embodiments, the disc bracket 60 is disposed within the pocket portion 54 of the disc 50 to facilitate attachment of the disc 50 to a pivot pin 90. The disc bracket 60 may be attached to the disc 50 using fasteners 69A,B or other attachment technique.

Figure 4:
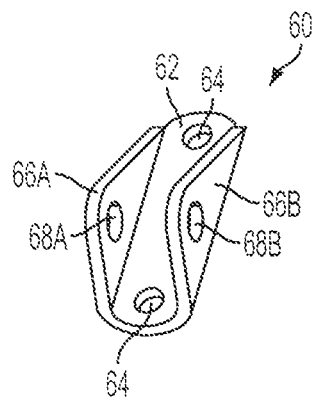
FIG. 4 is schematic diagram of a disc bracket 60 of the protection system 10 of FIG. 1.

FIG. 4 illustrates a disc bracket 60 in accordance with various embodiments. The disc bracket 60 includes a base 62 configured to engage the disc 50 and includes apertures 64 to facilitate attachment of the disc bracket 60 to the disc 50. The disc bracket 60 also includes two facing, substantially parallel flanges 66 A,B extending substantially perpendicularly from the base 62.

Referring to FIGS. 2 and 4, the flanges 66 A,B are spaced apart to receive a portion of the pivot bracket 70 therebetween. Each of the parallel flanges defines an aperture 68 A,B. These apertures are aligned and sized to accept the pivot pin 90 as will be described in greater detail later. In the protection system 10, the apertures 68 A,B are offset from the centerline of the disc 50 when the disc bracket 60 is attached to the disc 50.

Figure 5:
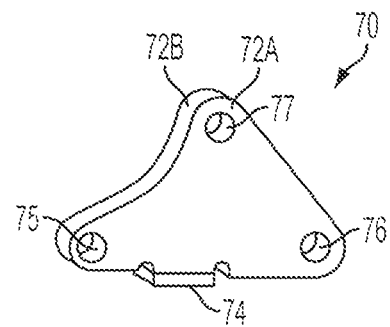
FIG. 5 is schematic diagram of a pivot bracket 70 of the protection system 10 of FIG. 1.

The pivot bracket 70 is pivotably connected to the disc 50 through the disc bracket 60. The pivot bracket 70 is configured to pivot relative to the brace 80. FIG. 5 illustrates a pivot bracket 70 in accordance with various embodiments. The illustrated pivot bracket 70 includes two facing, substantially planar triangular portions 72 A,B connected together by a flange 74 that is orthogonal to both triangular portions. The pivot bracket 70 defines a pivot aperture 76, a disc aperture 75 and a guide pin aperture 77, wherein each aperture 75,76,77 extends through both triangular portions 72A,B such that apertures in one triangular portion are substantially aligned with respective apertures in the other triangular portion.

Referring to FIGS. 2 and 5, in the protection system 10, a portion of the pivot bracket 70 is disposed between the flanges 66A,B of the disc bracket 60 such that the disc aperture 75 in the pivot bracket 70 is aligned with apertures 68A,B in the disc bracket 60. Pivot pin 90 is disposed within these apertures to create a pivoting connection between the disc bracket 60 (and as a consequence the disc 50) and the pivoting bracket 70. In the protection system 10, the axis of the pivot pin 90 is offset from the centerline of the disc 50.

Figure 6:
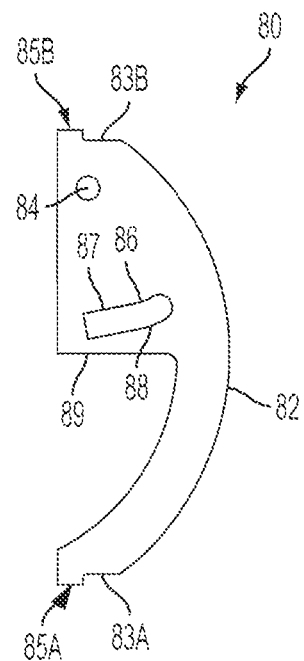
FIG. 6 is schematic diagram of a brace 80 of the protection system 10 of FIG. 1.

Referring to FIGS. 2 and 6, the brace 80 is disposed proximate the hydrant end 37 of the nozzle 20 and positions the other components of the protection system 10 within the nozzle 20. In various embodiments, the brace 80 is a substantially planar structure with a substantially semi-circle profile. Flat surfaces 85 A,B are formed proximate the termination points of the semi-circle profile. The semi-circle and the associated flats are dimensioned such that the linear distance between the flats is approximately equal to the minor pitch diameter of the threads formed proximate the hydrant end 37 of the nozzle 20. In the protection system 10, portions of the brace 80 proximate the flats are disposed in the notches 34 of the nozzle 20. When the nozzle 20 is installed to a hydrant, the mating threads in the hydrant (not shown) may assist in locating the brace through interaction with the flats formed in the brace 80. This engagement may also discourage excessive movement of the brace in a direction perpendicular to the axis of the nozzle 20. In other embodiments, the brace 80 is secured to the nozzle 20 without engagement with the hydrant.

The brace 80 may also include notches formed intermediate the semi-circle profile and the flats. These notches are configured to engage the retention ring 96 in the protection system 10. This engagement discourages movement of the brace 80 towards the hydrant along the axis of the nozzle 20.

The brace 80 further defines a pivot aperture 84 and a slot 86. In one embodiment of the protection system 10, a portion of the brace 80 is disposed within the pivot bracket 70, and the pivot aperture 84 is aligned with the pivot aperture 76 in the pivot bracket 70. Pivot pin 92 is disposed within these apertures.

In the illustrated embodiment, the slot 86 includes a substantially linear portion 87 and an arcuate portion 88. The linear portion 87 is sized to accept biasing member 98. In various embodiments, the biasing member 98 is a compression spring. The arcuate portion 88 is sized to accept the guide pin 94. In other embodiments, the slot 86 may be completely linear or arcuate.

Figure 7A:
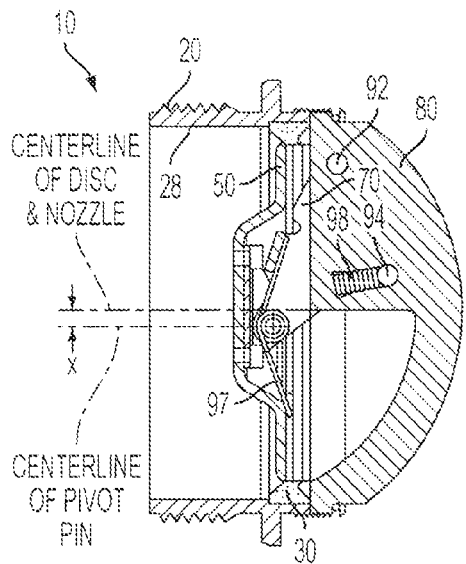
FIGS. 7A-C are cross-sectional views of the protection system 10 of FIG. 1 illustrating the disc in a closed position.

In various embodiments, the biasing member 98 is disposed within the linear portion of the slot 86 and the pivot bracket 70 is positioned such that the guide pin aperture 77 is aligned with the slot 86, as illustrated by FIGS. 6 and 7A. The guide pin 94 is disposed within the aperture 76 in the pivot bracket 70 and the slot 86. As a result, the biasing member 98 is restrained in the slot by the triangular portions 72 A,B of the pivot bracket 70. In the protection system 10, the biasing member 98 urges the guide pin 94 away from the linear section 87 and towards the end of the arcuate section 88 opposite the linear section 87. This biasing of the guide pin 94 translates into a biasing of the disc 50 against the seat 30 as will be discussed in greater detail below.

In various embodiments, the brace 80 defines a stop surface 89. This surface engages the disc and prevents further rotation about pivot pin 90.

Method of Operation for Protection System 10

Figure 7B:
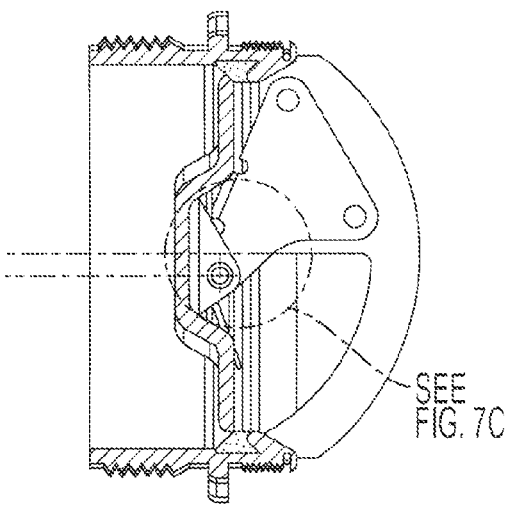
Figure 7C:
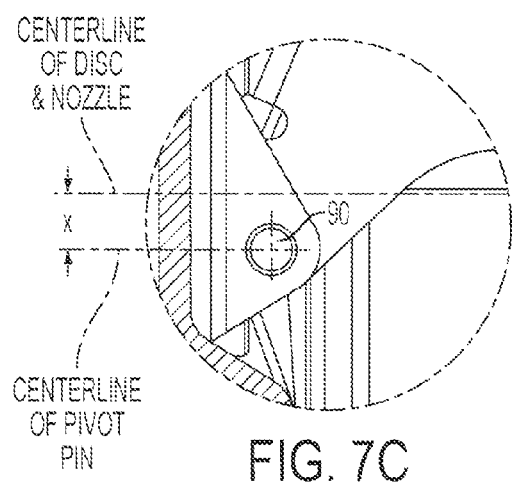

FIGS. 7A-C illustrate cross-sections of protection system 10 with the disc 50 in a normally closed position. In this position, the planar portion of the disc 50 is biased against the seat 30 thereby discouraging the flow of contaminates into the hydrant (not shown). The biasing force is provided by two biasing members 97,98. The biasing member 97 biases the disc 50 into an orientation substantially perpendicular with the nozzle bore 28. The biasing member 98 urges the guide pin 94 towards one end of the slot 86 in the brace 80 such that the pivot bracket 70 is rotated into its closed position. As a result, the disc 50 is urged into contact with the seat 30. In various embodiments, the disc 50 is substantially coaxial with the nozzle 20 in the closed position, but the centerline of the disc 50 is offset from the centerline of the pivot pin 90.

In the event the hydrant valve (not shown) is opened, water pressure within the hydrant will increase as a result of fluid communication with the municipal water supply. The pressure may be both dynamic and static pressure. As the pressure increases, a force is applied to the disc 50. The direction of the force is illustrated in FIGS. 8A. This force is transferred from the disc 50, through the disc bracket 60, to the pivot pin 90, and to the pivot bracket 70. This force results in a moment force being applied to pivot bracket 70 centered about pivot pin 92. In FIG. 8A, the moment force would be directed in a clockwise direction about pivot pin 92. As the force against the disc 50 increases, the resultant moment force will also increase such that the guide pin 94 is urged against the biasing member 98.

As the hydrant valve is opened and the dynamic and static pressure increases within the interior of the hydrant, the moment force will overcome the force of the biasing member 98 against the guide pin 94. Consequently, the guide pin 94 will move within the slot 86 against the biasing member 98, thereby allowing the pivot bracket 70 to rotate about pivot pin 92. As a result of this rotation, the disc 50 will move away from the seat 30. As illustrated in FIGS. 8A-C, the disc 50 moves axially with respect to the nozzle 20 and out of coaxial alignment with the nozzle 20.

In various embodiments, as the disc 50 moves away from the seat 30, the disc 50 remains substantially perpendicular to the centerline of the nozzle, but the disc 50 is no longer coaxial with the nozzle 20. This movement is illustrated in FIGS. 8A-C. In various other embodiments, the centerline of the disc 50 may not remain parallel with the axis of the nozzle 20. In some embodiments, the disc 50 may rotate about pivot pin 90 in a clockwise direction (with reference to FIGS. 8A-C) as a result of the biasing member 97. In further embodiments, the disc 50 may begin to rotate in a counter-clockwise direction about pivot pin 90 in response to the increasing dynamic and static pressure within the hydrant at the approximate same time as the disc 50 also pivots about pivot pin 92.

As noted above, the centerline of the disc 50 is offset from the pivot pin 90. As the pressure continues to increase, the disc 50 will have a tendency to rotate about pivot pin 90 because of the imbalance created by this offset. In various embodiments, the biasing member 97 maintains the disc 50 substantially perpendicular to the centerline of the nozzle. But, as the dynamic and static pressure increases, the force of the biasing member 97 may be exceeded, and as a result, the disc rotates about pivot pin 90.

Figure 9A:
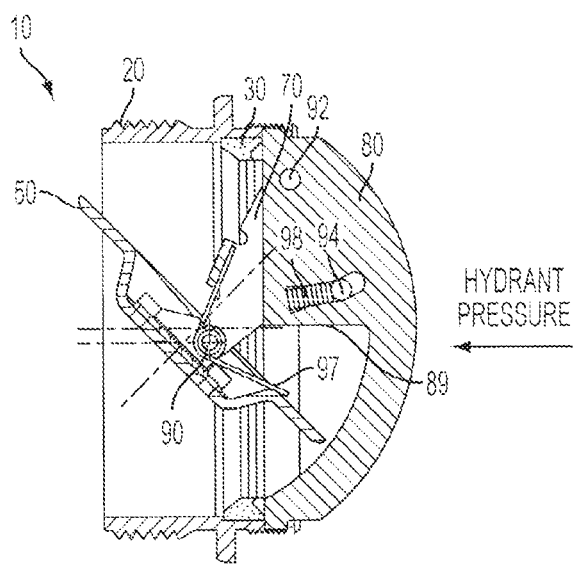
FIGS. 9 A-C are cross-sectional views of the protection system 10 of FIGS. 7A-C illustrating the disc partially rotated about pivot pin 90.
Figure 9B:
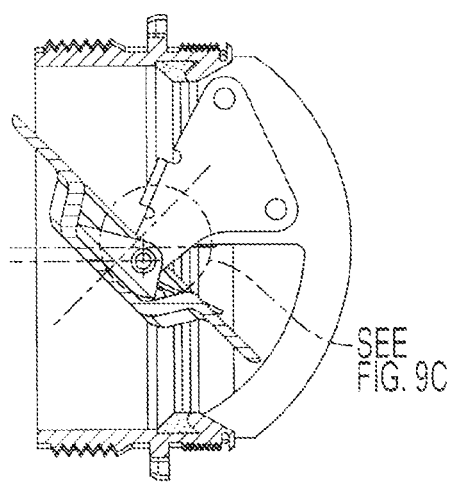
Figure 9C:
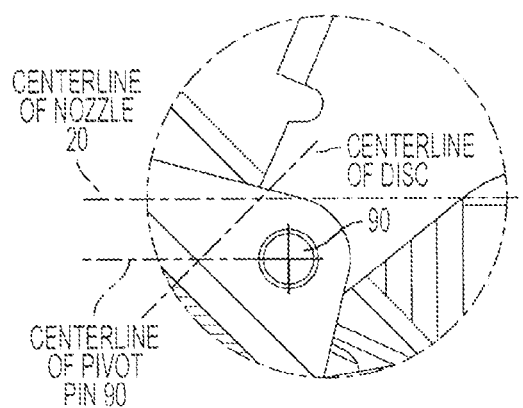
Figure 10A:
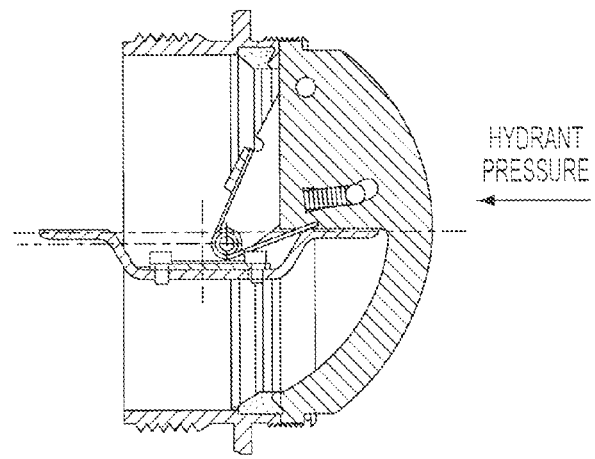
FIGS. 10 A-C are cross-sectional views of the protection system 10 of FIGS. 7A-C illustrating the disc in a fully open position.
Figure 10B:
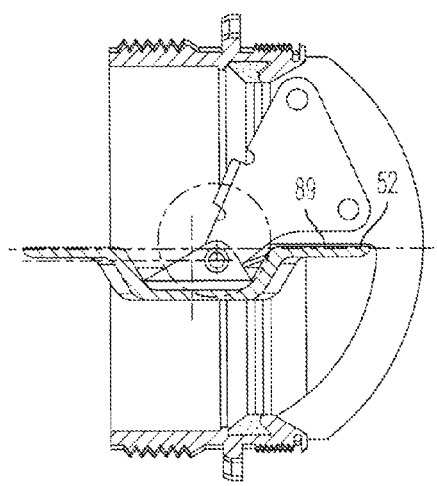
Figure 10C:
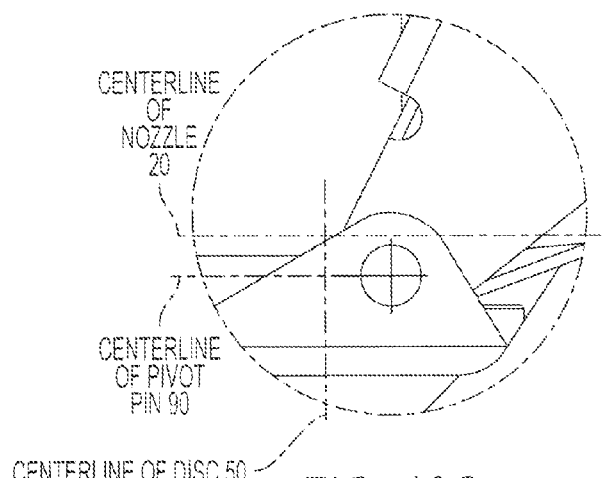

FIGS. 9A-C are cross-sectional views of the protection system 10 illustrating the initial pivoting of the disc 50 about pivot pin 90. This pivoting movement will continue until the fully open condition of the disc 50 is reached when the disc 50 contacts the stop surface 89 of the brace 80, illustrated in FIGS. 10A-C. In the illustrated embodiment, the rotation of the disc 50 is stopped when the planar portion 52 of the disc is substantially parallel with the centerline of the nozzle 20. In other embodiments, the brace 80 may be configured to stop the disc 50 at different orientations. As previously noted, the rotation of the disc 50 about the pivot pin 90 may begin at approximately the same time as the disc 50 rotates about pivot pin 92 or at a different time, such as sequentially thereafter.

When the hydrant valve is closed and fluid communication between the water supply and the inside of the hydrant (not shown) is ceased, the disc 50 will return to its closed position. Specifically, the biasing member 97 will urge the disc 50 to rotate about pivot pin 90 such that the planar portion 52 of the disc 50 is substantially perpendicular with the centerline of the nozzle 20. The pivot bracket 70 will also pivot in response to the biasing member 98 urging the guide pin 94 into its closed position against the end of the slot 86.

To facilitate understanding of the operations of the protection system 10, the movements of the disc 50 in response to changes in pressure have been described as being in series. However, it should be understood that in various embodiments, the disc 50 may rotate about pivot pin 90 as the pivot bracket 70 is pivoting about pivot pin 92.

Protection System 100

Figure 11:
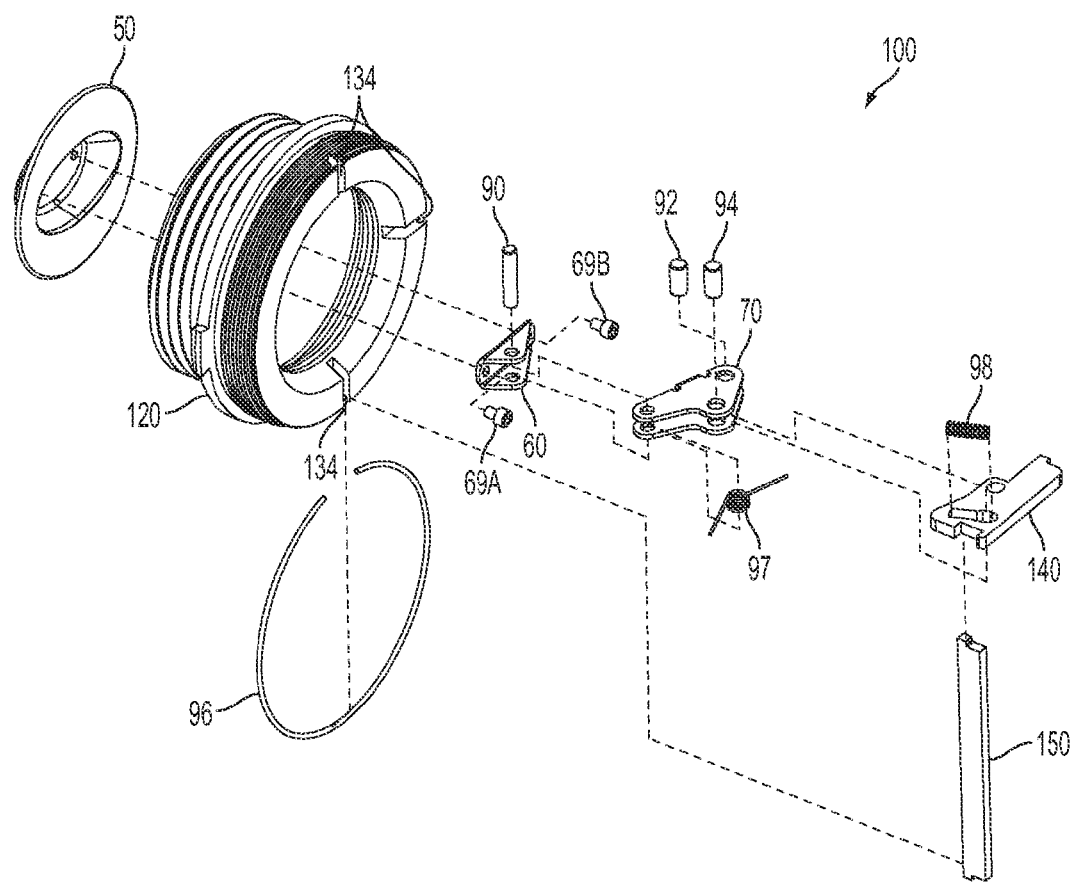
FIG. 11 is an exploded view of a protection system 100 in accordance with an embodiment as disclosed.

FIG. 11 is an exploded view of the protection system 100 in accordance with an alternative embodiment. This protection system uses the same disc 50, disc bracket 60, and pivot bracket 70 as discussed above with a different nozzle 120 and brace 140. In the protection system 100, a bar 150 supports the brace 140 within the nozzle 120.

Similar to the previously described embodiments, the nozzle 120 provides a conduit for directing water from a fire hydrant to a hose in fire hydrant applications. The disc 50 is positioned within the nozzle 120 and is biased against a seal within the nozzle 120 to prevent introduction of contaminates into the interior of the hydrant. In the event of a fire, a valve (not shown) within the hydrant (not shown) is opened by a fireman to provide access to the municipal water supply. As water pressure builds within the hydrant, the disc 50 will initially move away from the seal and then rotate such that water is allowed to flow past the protection system 100 into the hose (not shown) connected thereto. When the hydrant valve is closed, the disc 50 will return to its closed position against the seal.

Figure 12:
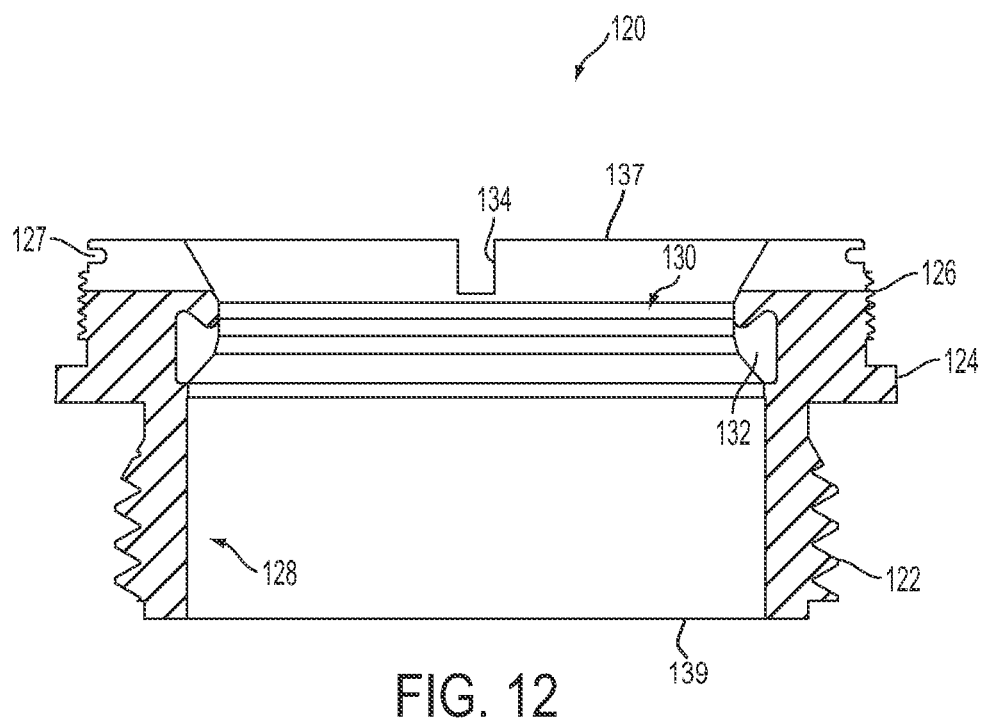
FIG. 12 is a schematic diagram of the nozzle 120 of the protection system 100 of FIG. 11.

FIG. 12 illustrates a cross-section of an embodiment of the nozzle 120 . The nozzle 120 is a substantially cylindrical structure with a hose engagement section 122 disposed proximate one end of the nozzle 120 and a hydrant engagement section 126 disposed on the opposite end of the nozzle 120. As noted above, the protection system 100 is configured to discourage introduction of contaminates from the hose end 139 of the nozzle 120 into the hydrant end 137 of the nozzle 120.

In the illustrated embodiment, the hose engagement section 122 and the hydrant engagement section 126 include threads to facilitate attachment with a hose coupling and a hydrant, respectively. In other embodiments, these two engagement sections may include other known or developed types of engagement configurations to facilitate attachment of a hose or hydrant to the nozzle 120.

Intermediate the hose engagement section 122 and the hydrant engagement section 126 is an attachment ring 124.

The attachment ring 124 protrudes outwardly from the circumference of the nozzle 120. In the illustrated embodiment, the attachment ring 124 is configured to engage a recess within the fire hydrant (not shown) and provides a way to secure the nozzle 120 to the hydrant. Other embodiments may not include an attachment ring 124.

The nozzle 120 defines a bore 128 having an inner diameter. An annular seat 130 is disposed within the bore 128. In various embodiments, the seat 130 is an annular ring extending inwardly from the bore 128, and includes a rubber seal 132. The seat 130 may include a groove or other attachment mechanism to retain the rubber seal 132. This seat 130 is configured to interact with the disc 50 to discourage introduction of contaminates into the interior of a fire hydrant or other pipeline. In further embodiments, the seat may not include a rubber seal.

The nozzle 120 includes mechanisms for securing other components of the protection system 100 within the nozzle 120. In various embodiments, the nozzle 120 includes three notches 134 proximate the hydrant end 137 of the nozzle 120 as illustrated in FIG. 11. These notches 134 are sized and shaped to receive portions of the brace 140 and the bar 150.

The nozzle 120 also includes a groove 127 disposed on the outer circumference of the nozzle proximate the hydrant end 37 of the nozzle. The groove 127 is sized to accept the retention ring 96, as illustrated in FIG. 11. In the protection system 100, portions of the brace 140 and the bar 150 are disposed in the notches 134 and the retention ring 96 is disposed in the groove 127. The retention ring 96 is configured to restrict movement of the brace 130 relative to the nozzle 120.

Referring to FIG. 11, the disc 50 in the protection system 100 is disposed within the nozzle 120 and is configured to move between a closed position, which discourages the flow of contaminates into the interior of the hydrant (not shown) and an open position, which allows fluid to flow from the hydrant to the hose (not shown). The disc 50 includes a surface configured to engage the seat disposed within the nozzle 120.

In the protection system 100, the pivot bracket 70 is pivotably connected to the disc 50 via bracket 60 and pin 90 similar to the attachment disclosed above with reference to the protection system 10. In the protection system 100, the axis of the pin 90 is offset from the centerline of the disc 50.

Figure 13:
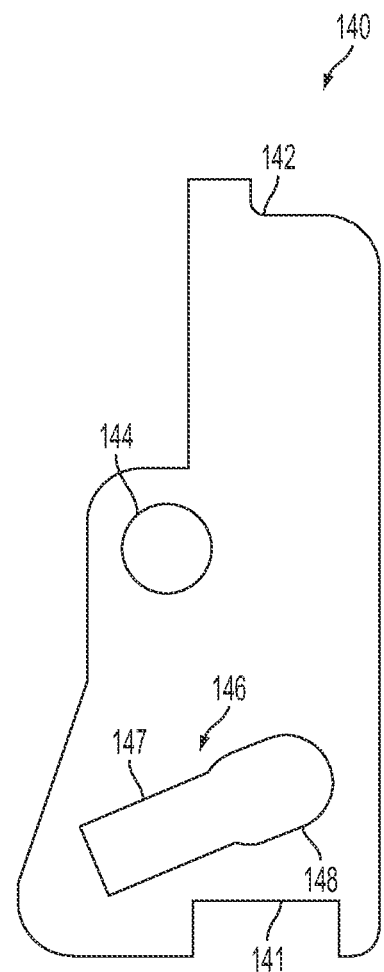
FIG. 13 is a schematic diagram of a brace 140 of the protection system 100 of FIG. 11.

The brace 140 is disposed proximate the hydrant end 137 of the nozzle 120 and positions the other components of the protection system 100 within the nozzle 120. FIG. 13 illustrates a brace 140 in accord with the current embodiment. In various embodiments, the brace 140 has a substantially planar structure. The brace 140 defines a notch 141 at one end that is sized to engage the bar 150. The brace 140 also defines a second notch 142 at the opposite end that is configured to engage the retention ring 96 in the protection system 100, as illustrated in FIG. 11. This engagement discourages movement of the brace 140 towards the hydrant along the axis of the nozzle 120.

The brace 140 further defines a pivot aperture 144 and a slot 146. In the illustrated embodiment, the slot 146 includes a biasing member retention portion 147 and a pin portion 148. The biasing member retention portion 147 is sized to accept biasing member 98 therein. In various embodiments, the biasing member 98 is a compression spring. The pin portion 38 is sized to accept the guide pin 94.

Referring to FIGS. 5, 11, and 13, a portion of the brace 140 is disposed within the pivot bracket 70, and the pivot aperture 144 is aligned with the pivot aperture 76 in the pivot bracket 70. Pivot pin 92 is disposed within these apertures to pivotably connect the brace 140 and the pivot bracket 70.

In various embodiments, the biasing member 98 is disposed within the biasing member retention portion 147 of the slot 146 and the pivot bracket 70 is positioned such that the guide pin aperture 77 is aligned with the slot 146. The guide pin 94 is disposed within the aperture 72 in the pivot bracket 70 and the slot 146. As a result, the biasing member 98 is held within the slot 146 by the pivot bracket 70. In the protection system 100, the biasing member 98 urges the guide pin 94 away from the biasing member retention portion 147 and towards the end of the pin portion 148 opposite the biasing member retention portion 147. This biasing of the guide pin 94 translates into a biasing of the disc 50 against the seat 130 as discussed in greater detail above.

The brace 140 is supported by bar 150. The bar 150 is an elongate structure and sized to engage notches 134 in the nozzle 120 and a notch in the brace 140. In various embodiments, the length of the bar 150 is approximately the same as the diameter of the nozzle 120. The bar 150 is secured to the nozzle via retention ring 96.

Method of Operation for Protection System 100

Figure 14A:
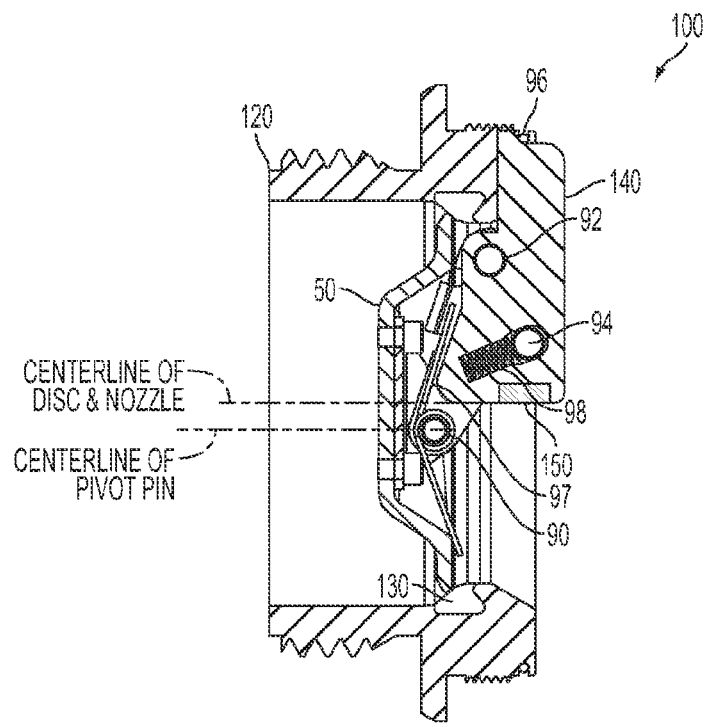
FIGS. 14 A-B are cross-sectional views of the protection system 100 of FIG. 11 illustrating the disc in a closed position.
Figure 14B:
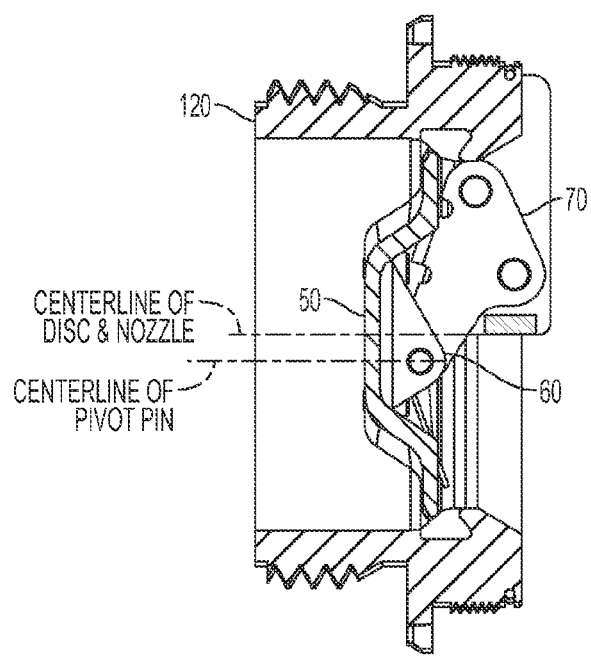

FIGS. 14A-B illustrate cross-sections of protection system 100 with the disc 50 in a normally closed position. In this position, the disc 50 is biased against the seat 130 thereby discouraging the flow of contaminates into the hydrant (not shown). The biasing force is provided by the two biasing members 97,98. The biasing member 97 biases the disc 50 into an orientation substantially perpendicular with the nozzle centerline. The biasing member 98 urges the guide pin 94 towards one end of the slot 146 in the brace 140 such that the pivot bracket 70 is rotated into its closed position. As a result, the disc 50 is urged into contact with the seat 130. In various embodiments, the disc 50 is substantially coaxial with the nozzle 120 in the closed position, but the centerline of the disc 50 is offset from the centerline of the pivot pin 90.

Figure 15A:
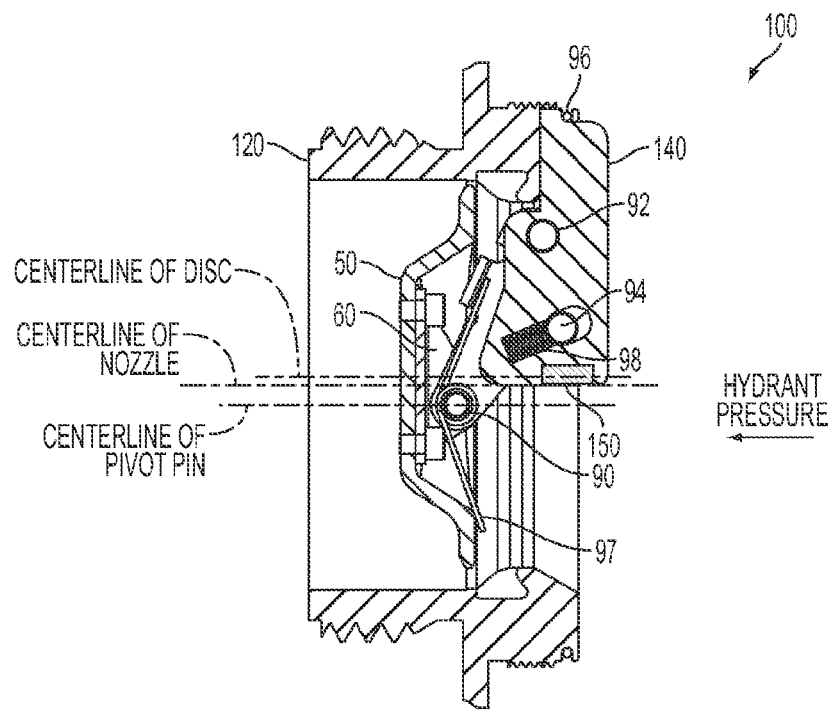
FIGS. 15 A-B are cross-sectional views of the protection system 100 of FIGS. 14A-B illustrating the disc moved relative to the nozzle.
Figure 15B:
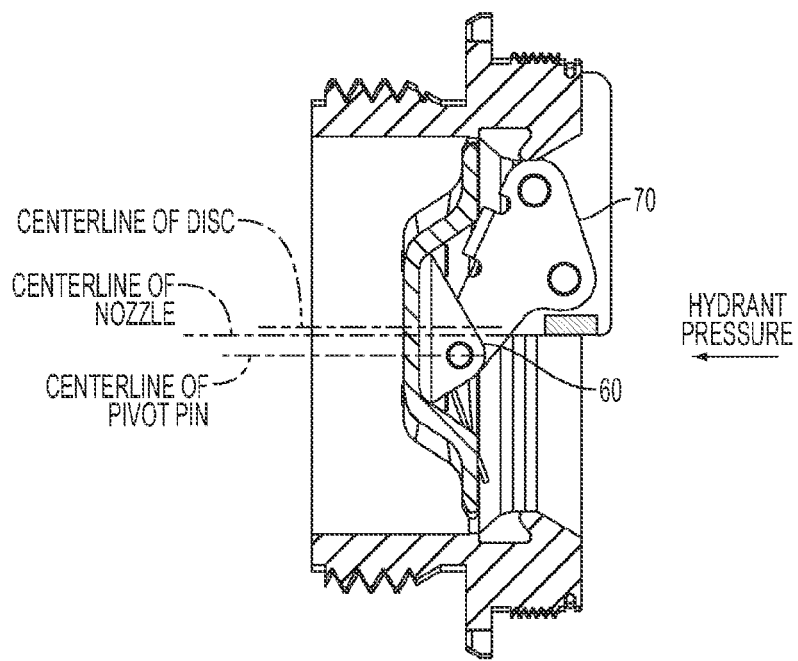

In the event the hydrant valve (not shown) is opened, water pressure within the hydrant will increase as a result of fluid communication with the municipal water supply. The pressure may be both dynamic and static. As the pressure increases, a force is applied to the disc 50. The direction of the force is illustrated in FIGS. 15A-B. This force is transferred from the disc 50, through the disc bracket 60 to the pivot pin 90 and to the pivot bracket 70. This force results in a moment force being applied to pivot bracket 70 centered about pivot pin 92. In FIG. 15A, the moment force would be directed in a clockwise direction about pivot pin 92. As the force against the disc 50 increases, the resultant moment force will also increase such that the guide pin 94 is urged against the biasing member 98.

As the hydrant valve is opened and the dynamic and static pressure increases within the interior of the hydrant, the moment force will overcome the force of the biasing member 98 against the guide pin 94. Consequently, the guide pin 94 will move within the slot 146 against the biasing member, thereby allowing the pivot bracket 70 to rotate about pivot pin 92. As a result of this rotation, the disc 50 will move away from the seat 130. As illustrated in FIGS. 15A-B, the disc 50 moves axially with respect to the nozzle 120 and out of coaxial alignment with the nozzle 120.

In various embodiments, as the disc 50 moves away from the seat 130, the disc 50 remains substantially perpendicular to the centerline of the nozzle 120, but the disc 50 is no longer coaxial with the nozzle 120. This movement is illustrated in FIGS. 15A-B. In various other embodiments, the centerline of the disc 50 may not remain parallel with the axis of the nozzle 120. In some embodiments, the disc 50 may rotate about pivot pin 90 in a clockwise direction (with reference to FIG. 15A-B) as a result of the biasing member 97. In further embodiments, the disc 50 may begin to rotate in a counter-clockwise direction about pivot pin 90 in response to the increasing dynamic and static pressure within the hydrant at the approximate same time as the disc 50 also pivots clockwise about pivot pin 92.

As noted above, the centerline of the disc 50 is offset from the pivot pin 90. As the pressure continues to increase, the disc 50 will have a tendency to rotate about pivot pin 90 because of the imbalance created by this offset. In various embodiments, the biasing member 97 maintains the disc 50 substantially perpendicular to the centerline of the nozzle. But, as the dynamic and static pressure increases, the force of the biasing member 97 may be exceeded, and as a result, the disc may rotate about pivot pin 90.

Figure 16A:
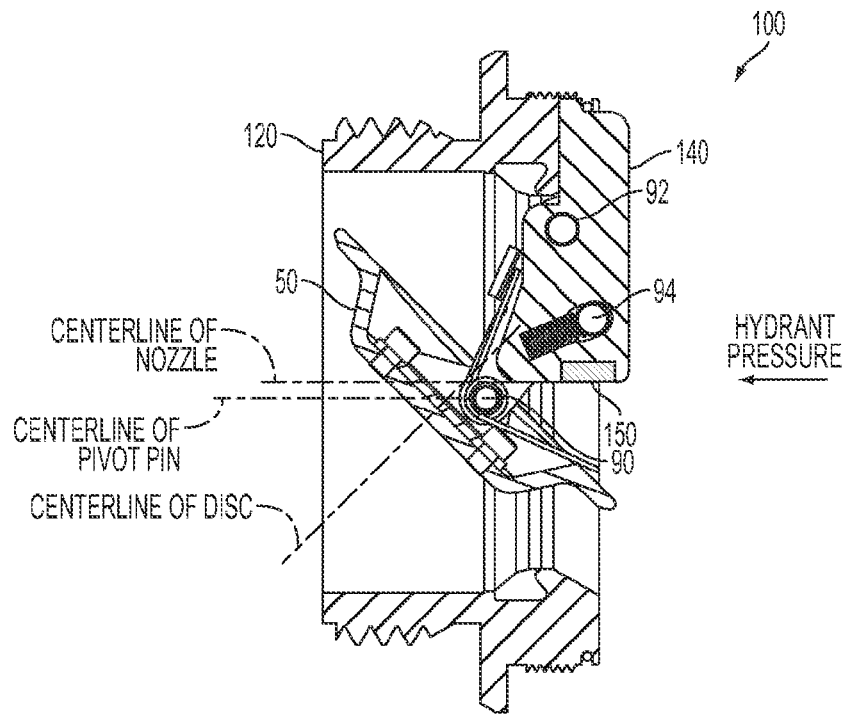
FIGS. 16 A-B are cross-sectional views of the protection system 100 of FIGS. 14A-B illustrating the disc partially rotated about pivot pin 90.
Figure 16B:
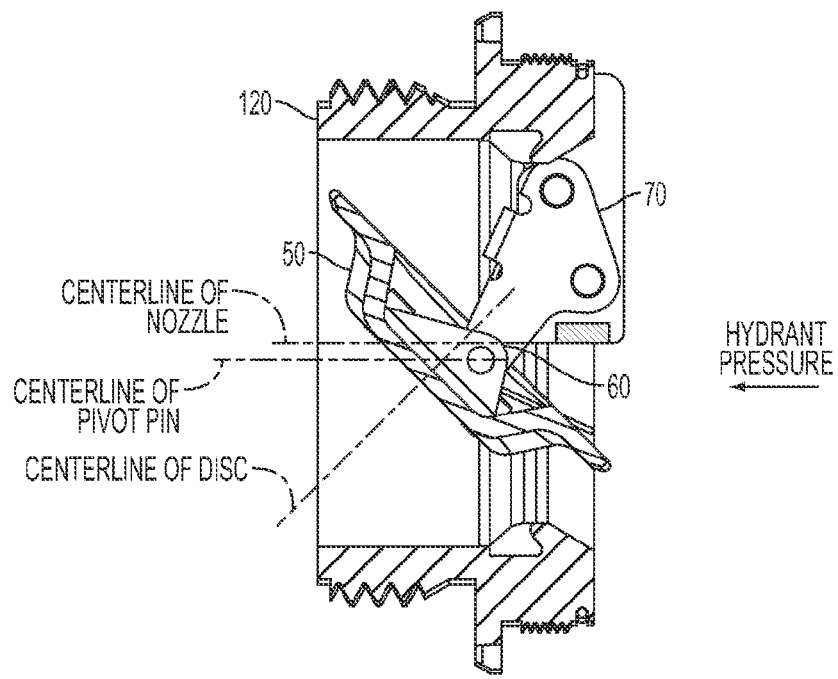
Figure 17A:
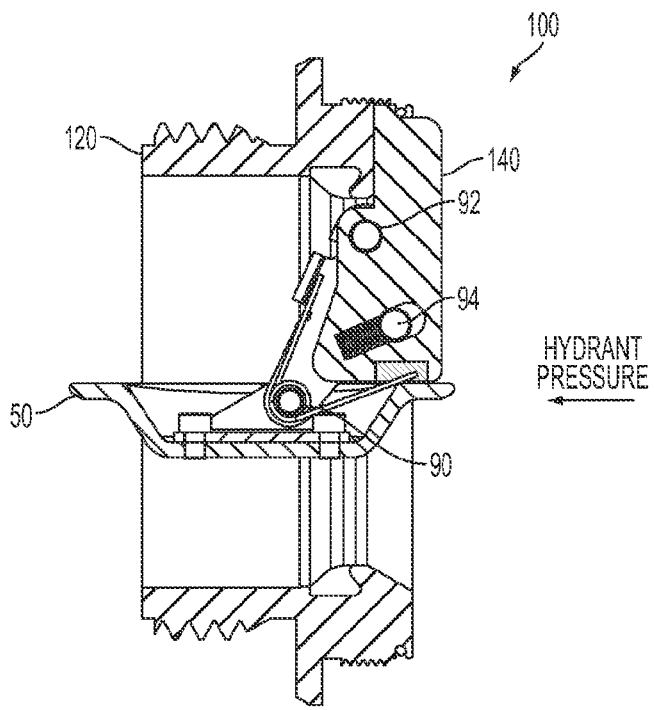
FIGS. 17 A-B are cross-sectional views of the protection system 100 of FIGS. 14A-B illustrating the disc in a fully open position.
Figure 17B:
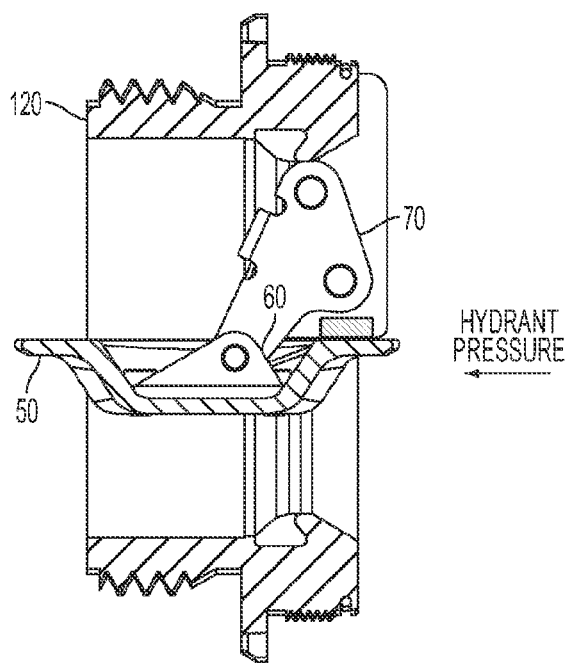

FIGS. 16A-B are cross-sectional views of the protection system 100 illustrating the initial pivoting of the disc 50 about pivot pin 90. This pivoting movement will continue until the fully open condition of the disc 50 is reached when the disc 50 contacts the brace 140. This condition is illustrated in FIGS. 17A-B. In the illustrated embodiment, the rotation of the disc 50 is stopped when the disc 50 is substantially parallel with the centerline of the nozzle 120. In other embodiments, the brace 140 may be configured to stop the disc 50 at different orientations. As previously noted, the rotation of the disc 50 about the pivot pin 90 may begin at approximately the same time as the disc 50 rotates about pivot pin 92.

When the hydrant valve is closed and fluid communication between the water supply and the inside of the hydrant (not shown) is ceased, the disc 50 will return to its closed position. Specifically, the biasing member 97 will urge the disc 50 to rotate about pivot pin 90 such that the disc 50 is substantially perpendicular with the centerline of the nozzle 30. The pivot bracket 70 will also pivot in response to the biasing member 98 urging the guide pin 94 into its closed position against the end of the slot 146.

To facilitate understanding of the operations of the protection system 100, the movements of the disc 50 in response to changes in pressure have been described as being in series. However, it should be understood that in various embodiments, the disc 50 may rotate about pivot pin 90 as the pivot bracket 70 is pivoting about pivot pin 92.

Many modifications and other embodiments set forth herein will come to mind to one skilled in the art to which features these embodiments pertain having the benefit of the teachings presented in the foregoing descriptions and the associated drawings. Therefore, it is to be understood that this disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A protection system for protecting a fire hydrant having an interior, the protection system comprising:
a nozzle having a first end to be secured to the hydrant and a second end configured to engage a fire hose coupling, the nozzle defining a bore that is in fluid communication with the interior of the fire hydrant when the nozzle is connected to the hydrant, wherein the nozzle defines a seat disposed in the bore; and
a disc disposed within the bore, pivotably connected to the nozzle by at least two pivot pins, and configured to move axially and rotationally from a normally closed position to an open position in response to an increase in pressure within the interior of the fire hydrant.

2. The protection system of claim 1, wherein a center of the disc is coaxial with the nozzle in the closed position and moves out of coaxial alignment in the open position.

3. The protection system of claim 1, further comprising a first biasing member and a second biasing member which cooperate to bias the disc against the seat.

4. A protection system for protecting a fire hydrant having an interior, the protection system comprising:
a nozzle having a first end to be secured to the hydrant and a second end configured to engage a fire hose coupling, the nozzle defining a bore that is in fluid communication with the interior of the fire hydrant, wherein the nozzle defines a seat disposed in the bore;
a disc disposed within the bore and configured to move from a normally closed position to an open position in response to an increase in pressure within the interior of the fire hydrant; and
at least two pivot pins disposed intermediate the first end of the nozzle and the disc, wherein the two pivot pins pivotably connect the disc relative to the nozzle, and wherein the disc pivots about the two pivot pins to move axially and rotationally from the normally closed position to the open position.

5. The protection system of claim 4, wherein the longitudinal axes of the two pivot pins are substantially parallel and offset from the center of the disc.

6. The protection system of claim 4, wherein the longitudinal axis of one of the two pivot pins is substantially stationary.

7. The protection system of claim 4, wherein a center of the disc is coaxial with the nozzle in the closed position and moves out of coaxial alignment in the open position.

8. The protection system of claim 4, further comprising a first biasing member and a second biasing member which cooperate to bias the disc against the seat.

9. A protection system for protecting a fire hydrant having an interior, the protection system comprising:
a nozzle having a first end to be secured to the fire hydrant and a second end configured to engage a fire hose coupling, the nozzle defining a bore that is in fluid communication with the interior of the fire hydrant, wherein the nozzle defines a seat disposed in the bore;
a disc disposed within the bore that is configured to move from a normally closed position where the disc is biased against the seat to an open position where fluid is permitted to flow from the first end of the nozzle to the second end of the nozzle;
a brace disposed proximate the first end of the nozzle; and
a bracket pivotably attached to the brace about a first axis and pivotably attached relative to the disc about a second axis,
wherein the bracket is configured to pivot about the first axis and the disc is configured to pivot about the second axis as the disc moves from the normally closed position to the open position in response to an increase in pressure within the interior of the fire hydrant.

10. The protection system of claim 9, further comprising a first biasing member configured to bias the disc towards the seat.

11. The protection system of claim 9, wherein the nozzle includes a plurality of notches configured to engage the brace.

12. The protection system of claim 9, further comprising a retention ring disposed in a groove formed proximate the first end of the nozzle and a groove formed in the brace, wherein the retention ring discourages movement of the brace in a direction parallel with the bore.

13. The protection system of claim 9, wherein a center of the disc is coaxial with the nozzle in the close position and moves out of alignment in the open position.

14. The protection system of claim 9, further comprising a disc bracket secured to the disc wherein the disc bracket is pivotably attached to the bracket.

15. The protection system of claim 9, further comprising
a guide pin secured to the bracket and engaging a slot in the brace; and
a biasing member disposed in the slot and configured to bias the guide pin such that the disc is biased against the seat.

16. The protection system of claim 9, wherein the brace includes a stop configured to selectively engage the disc and restrict the amount of rotation of the disc in response to the pressure within the hydrant exceeding the second threshold.

17. The protection system of claim 9, wherein the bracket comprises two substantially parallel components joined by a flange.

18. A pipeline protection system comprising:
a nozzle having a first end and a second end with a bore providing a fluid communication path from the first end to the second end, wherein the nozzle includes a seat disposed in the bore intermediate the first end and the second end;
a disc disposed within the bore that is configured to move from a normally close position where the disc is biased against the seat to discourage the flow of contaminates, from the second end of the nozzle to the first end of the nozzle, to an open position where fluid is permitted to flow from the first end of the nozzle to the second end of the nozzle;
a brace disposed proximate the first end of the nozzle; and
a bracket pivotably attached to the brace about a first axis and pivotably attached relative to the disc about a second axis,
wherein the bracket is configured to pivot about the first axis and the disc is configured to pivot about the first axis and the second axis as the disc moves from the normally closed position to the open position in response to an increase in pressure differential between the first end of the nozzle and the second end of the nozzle.

* * * * *